United States Patent [19]
Moore

[11] Patent Number: 6,015,239
[45] Date of Patent: Jan. 18, 2000

[54] PASSIVELY ALIGNED OPTO-ELECTRONIC COUPLING ASSEMBLY

[75] Inventor: Andrew J. Moore, Broomfield, Colo.

[73] Assignee: Cielo Communications, Inc., Broomfield, Colo.

[21] Appl. No.: 09/063,122

[22] Filed: Apr. 20, 1998

[51] Int. Cl.[7] .................................................. G02B 6/255
[52] U.S. Cl. .............................................................. 385/92
[58] Field of Search ................................. 385/88–95, 147

[56] References Cited

U.S. PATENT DOCUMENTS

| | | | |
|---|---|---|---|
| 4,964,692 | 10/1990 | Prescott | 385/15 |
| 5,233,283 | 8/1993 | Kennedy | 320/115 |
| 5,614,131 | 3/1997 | Mukerji et al. | 264/1.9 |
| 5,845,030 | 12/1998 | Sasaki et al. | 385/88 |

*Primary Examiner*—Akm E. Ullah
*Attorney, Agent, or Firm*—Christie, Parker & Hale, LLP

[57] ABSTRACT

There is disclosed herein an opto-electronic coupling assembly for optically coupling a light active area of an active device with an end face that is disposed at one end of an elongated light guide such that light is coupled between the end face of the light guide and the light active area of the active device. The coupling assembly includes a light guide end housing that defines a housing outline and which is adapted to support the end of the light guide including its end face. The opto-electronic coupling assembly further includes an active device package which itself includes an arrangement for supporting the active device and for providing external electrical connections to the active device. An encapsulant material surrounds the active device and at least partially surrounds the support arrangement. The encapsulant material is substantially optically transparent to the coupled light and is molded in a predetermined configuration which cooperates with the housing outline of the light guide end housing in a way that passively places the light active area of the active device into substantial optical alignment with the end face of the light guide when the light guide end housing is assembled with the active device package. In one alternative, the assembly may be configured for coupling an array of light guides with a corresponding array of individual and/or integrated active devices which are positioned in the active device package. In another alternative, the active device package may include different types of active devices arranged in a predetermined way relative to one or more light guides.

25 Claims, 7 Drawing Sheets

PASSIVELY ALIGNED OPTO-ELECTRONIC COUPLING ASSEMBLY

BACKGROUND OF THE INVENTION

The present invention relates generally to passively alignable opto-electronic coupling assemblies and more particularly to an opto-electronic coupling assembly in which an active device is passively aligned with an end face of an elongated light guide. An associated method is also disclosed.

Optical communication systems utilizing light conductive members such as, for example, fiber optic cables are increasingly popular for reasons including, but not limited to very high bandwidth capabilities. Light transmitted by fiber optic cables is, in most instances, produced by a light emitting semiconductor device which is optically coupled to an end face of the fiber optic cable.

In the prior art, significant attention has been devoted to opto-electronic assemblies which optically couple a semiconductor device with a fiber optic cable. Of course, such opto-electronic assemblies must provide proper support for the semiconductor device. Other provisions must be made for electrical interfacing and heat dissipation. One paramount requirement resides in achieving proper optical alignment (i.e., efficient light coupling) between the output of the semiconductor device and the input face of the fiber optic cable. In this regard, many prior art assemblies employ an "active" alignment approach in which a trained technician or automated assembly equipment actually performs one or more alignment adjustments on each assembly. It should be appreciated that the active alignment approach adds considerable cost to the manufacturing process. Therefore, a "passive" alignment approach is generally preferred in which no alignment adjustments are required. However, for reasons to be discussed immediately hereinafter, it is submitted that few if any practical and inexpensive passive alignment approaches have been provided in the prior art.

Alignment difficulties are introduced both by characteristics of fiber optic cables and by characteristics of various types of light producing semiconductor devices used in the assembly. With regard to fiber optic cables, it should be appreciated that the "target" (i.e., input face) of a typical cable is quite small. For example, the input face of a multi-mode fiber is typically 50 microns in diameter, however, diameters up to 125 microns are available for glass fibers. As another example, the input face of a single mode fiber is a mere 5 microns in diameter. Thus, the difficulties of passive alignment begin to become evident in view of fiber input face diameters alone.

Semiconductor devices which are useful in opto-electronic assemblies include light emitting diodes (LED's), edge emitting lasers (one group being referred to as CD lasers) and Vertical Cavity Surface Emitting Lasers (hereinafter VCSEL's). Relevant characteristics of these light producing devices will be discussed at appropriate points hereinafter. For the moment, it is sufficient to say that light emission characteristics and certain other characteristics such as, for example, moisture resistance vary significantly between these various device types. The relevant characteristics of these devices must be considered in coupling any of them with a fiber optic cable in any sort of alignment scheme, including that of passive alignment.

The present invention provides a light coupling arrangement and associated method which incorporate a highly advantageous passive optical alignment feature and which is particularly well suited for use with individual or arrayed light emitting devices amenable to plastic encapsulation.

SUMMARY OF THE INVENTION

As will be described in more detail hereinafter, there is disclosed herein an opto-electronic coupling assembly for optically coupling a light active area of an active device with an end face that is disposed at one end of an elongated light guide such that light is coupled between the end face of the light guide and the light active area of the active device. The coupling assembly includes a light guide end housing that defines a housing outline and which is adapted to support the end of the light guide including its end face. The opto-electronic coupling assembly further includes an active device package which itself includes an arrangement for supporting the active device and for providing external electrical connections to the active device. An encapsulant material surrounds the active device and at least partially surrounds the support arrangement. The encapsulant material is substantially optically transparent to the coupled light and is molded in a predetermined configuration which cooperates with the housing outline of the light guide end housing in a way that passively places the light active area of the active device into substantial optical alignment with the end face of the light guide when the light guide end housing is assembled with the active device package.

In one aspect of the invention, the molded encapsulant may be molded to include a lens which forms part of the encapsulant and which serves to direct light between the end face of the light guide and the light active area of the active device.

In another aspect of the invention, a plurality of individual or arrayed active devices may be housed in the active device package within the encapsulant material. The predetermined configuration of the encapsulant material cooperates with the housing outline of the light guide end housing so as to passively align the light active area of each active device with an end face of one of a plurality of elongated light guides which are supported by the light guide end housing.

BRIEF DESCRIPTION OF THE DRAWINGS

The present invention may be understood by reference to the following detailed description taken in conjunction with the drawings briefly described below.

DETAILED DESCRIPTION OF THE INVENTION

Figures 1, 2, 3, 4:
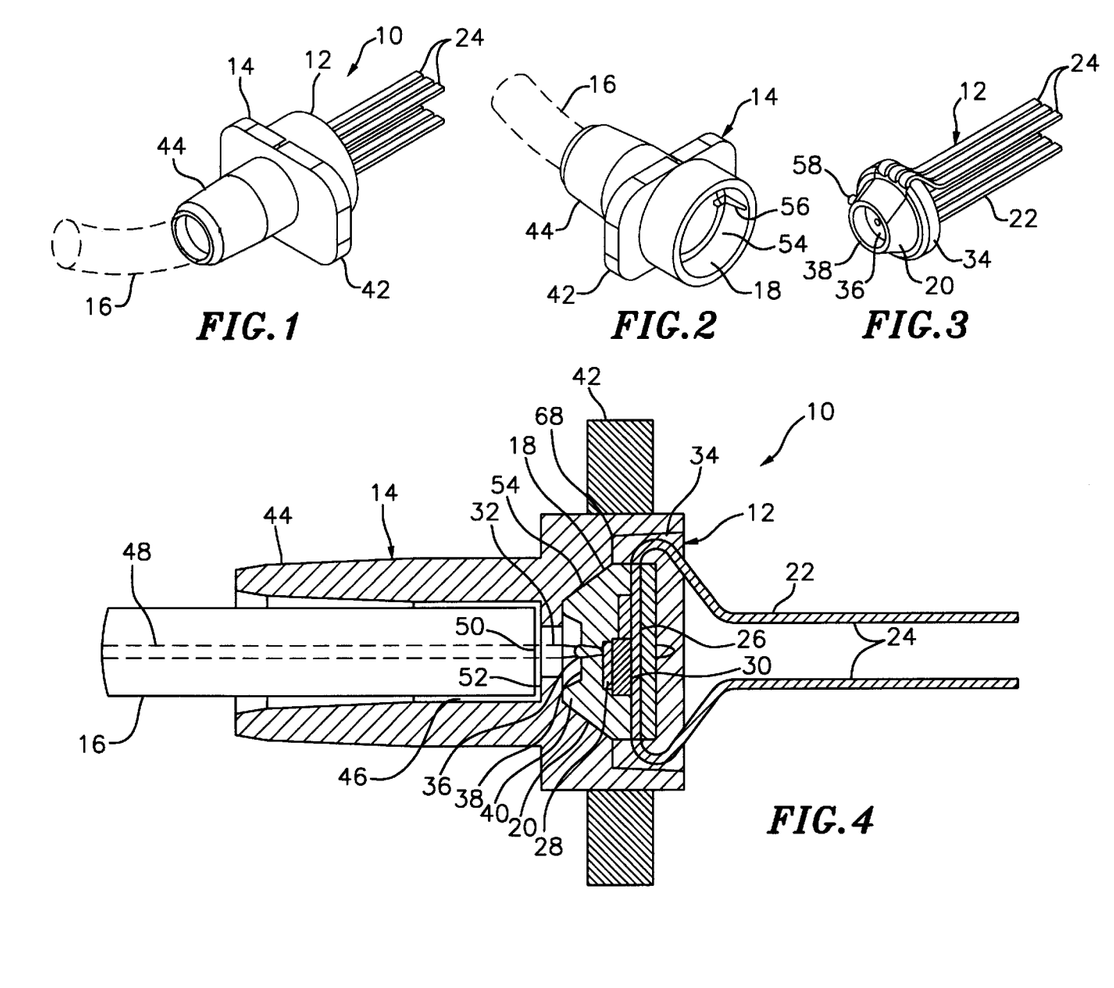
FIG. 1 is an enlarged diagrammatic view, in perspective, of a first embodiment of an opto-electronic coupling assembly which is manufactured in accordance with the present invention.
FIG. 2 is an enlarged diagrammatic view, in perspective, of a light guide end housing which forms part of the opto-electronic assembly of FIG. 1 and which is adapted to support one end of an elongated light guide.
FIG. 3 is an enlarged diagrammatic view, in perspective, of an active device package which forms part of the opto-electronic assembly of FIG. 1 and which supports an active device within an overall encapsulant material.
FIG. 4 is an enlarged diagrammatic view, in elevation, of the opto-electronic coupling assembly of FIG. 1 shown here to illustrate details of its construction.
Figure 5:
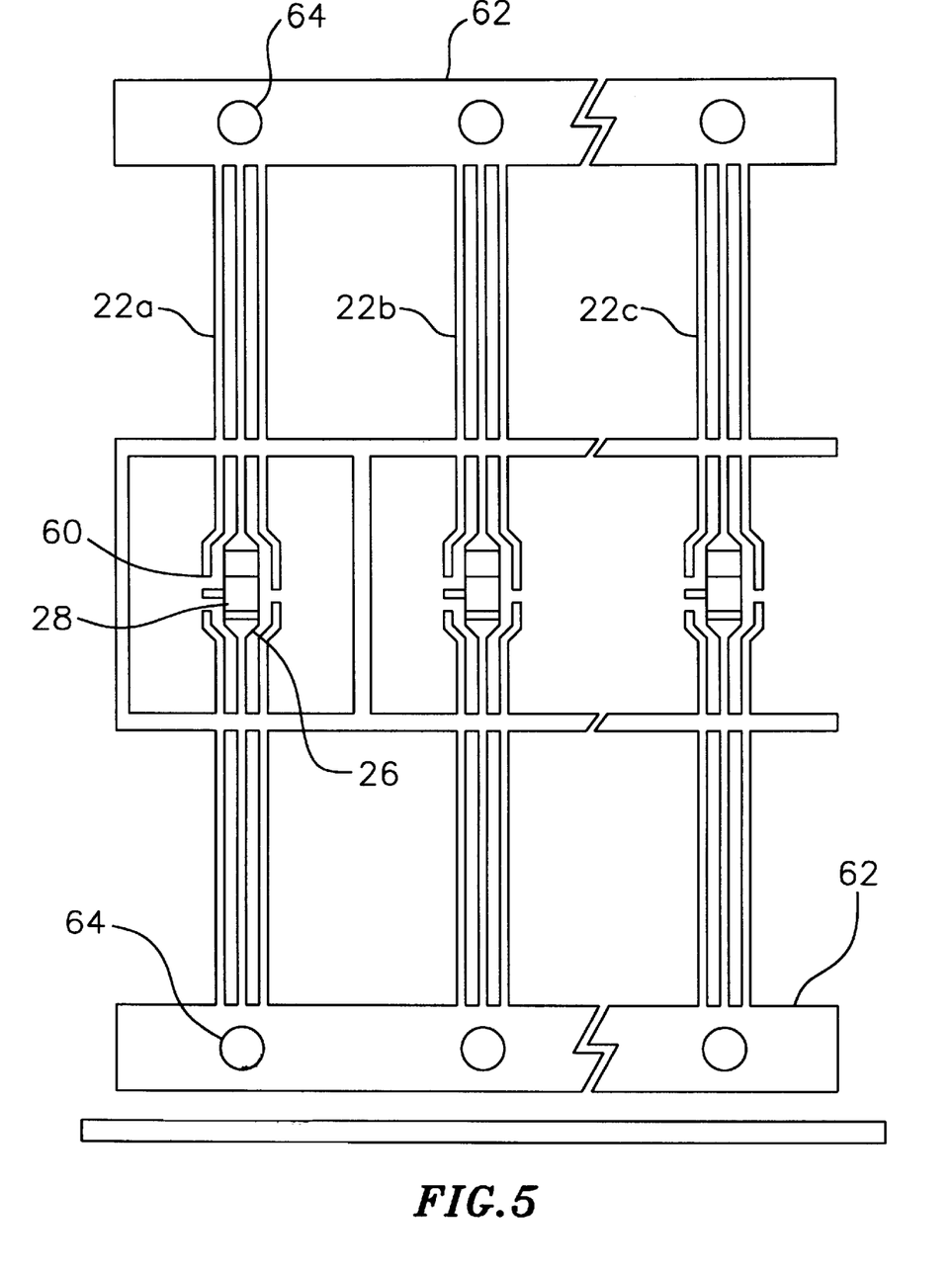
FIG. 5 is an enlarged diagrammatic plan view illustrating details of one embodiment of a leadframe which is used in the overall opto-electronic coupling assembly of the present invention to support the active device in a predetermined position and to provide electrical connections thereto.

Attention is immediately directed to FIGS. 1–3 which illustrate one embodiment of an opto-electronic coupling assembly manufactured in accordance with the present invention and generally indicated by the reference numeral 10. Assembly 10 includes an active device package 12 and a light guide end housing 14 which supports one end of a fiber optic cable 16. Light guide end housing 14 defines a frusto-conical cavity 18 which is configured for receiving a frusto-conical section 20 of the active device package in a predetermined way, as will be described in detail hereinafter.

Turning to FIG. 4 in conjunction with FIGS. 1–3, active device package 12 includes a lead frame 22 having a plurality of electrically conductive leads 24 (in this instance six leads) and a die attach pad 26. Lead frame 22 may be formed from suitable materials such as, for example, KOVAR, ALLOY 42 and ALLOY 52. A VCSEL 28 is mounted on a stand-off 30 which is, in turn, mounted on die attach pad 26. A VCSEL 28 may be mounted on stand-off 30, for example, by a suitable thermally conductive epoxy (not shown). A photodetector 31 is also mounted on die attach pad 26 adjacent to VCSEL 28. It is noted that photodetector 31 is not required, but may be used, for example, in regulating the light output power of VCSEL 28. Lead frame 22 may include any suitable number of lead frame leads 24 depending upon the interconnection requirements of the device to be positioned thereon. Bonding wires are used in a known manner to electrically interconnect lead frame leads 24 with the VCSEL, but have not been shown in the present figures for purposes of clarity. During operation, VCSEL 28 emits a beam 32 of light. Typically, beam 32 is in the 700 to 900 nm wavelength range for semiconductor lasers. However, it is to be understood that the present invention is not to be considered as limited to use of a VCSEL serving as a light emitting semiconductor device. Any suitable light emitting or light receiving semiconductor device either currently available or to be developed may be used. Moreover, the device may emit or receive either visible or invisible light. Presently, for reasons which will be described, VCSEL's and photodetector type semiconductors (not shown) are well suited for use in the present invention.

Referring to FIGS. 3 and 4, active device package 12 further includes an encapsulant material 34 which surrounds VCSEL 28, die attach pad 26 and portions of lead frame leads 24. Any suitable encapsulant material may be used provided that the material is substantially optically transparent to beam 32 or, in the instance of a photodetector, the material is substantially optically transparent to light which is to be received from fiber optic cable 16. That is, the encapsulant material is substantially transparent at the wavelength of interest and may, in fact, serve a filtering function by virtue of being relatively opaque at other, undesired wavelengths. In accordance with the present invention, encapsulant material 34 is molded in a predetermined configuration which serves in several capacities beyond supporting the overall assembly. In particular, encapsulant material 34 defines aforementioned frusto-conical section 20. The latter cooperates with the configuration of frusto-conical cavity 18 of light guide end member 14 in a highly advantageous way within the context of an overall passive alignment feature of the present invention which will be described in detail following a detailed description of the light guide end housing. In addition, the encapsulant material from which frusto-conical section 20 may form an integral molded lens 36 positioned on a coupling surface 38 that may be surrounded by a peripheral lip 40. These features will be described at appropriate points below.

Turning to FIGS. 2 and 4, in addition to defining frusto-conical cavity 18, light guide end housing 14 includes a mounting flange 42 and a fiber optic cable sleeve 44. The latter is configured for receiving a ferrule 46 which is positioned on the end of fiber optic cable 16. The fiber optic cable includes a centered light guide member 48 having an end face 50 disposed at the end of the fiber. Fiber optic cable sleeve 44 is configured to receive cable 16 in such a way that the sleeve abuts against a stop face 52. In this manner, the position of end face 50 of the cable is in a known, predictable position within the light guide end housing and relative to a surface 54 defining frusto-conical cavity 18. It should be noted that various types of fiber optic cables are provided with various different types of ferrules. The present invention is highly advantageous since light guide end members may readily be provided for any of these cable configurations. As mentioned previously, the end face of the fiber optic cable is as small as 5 microns. Therefore, precise positioning of the end face of the cable relative to the frusto-conical cavity, as provided by the light guide end member, is crucial within the overall passive alignment feature of the present invention. End member 14 further includes a key way 56 (see FIG. 2) which is configured to receive a key tab 58 (see FIG. 3) that is also defined by encapsulant material 34 of device package 12. The light guide end housing may be formed from any suitable material including, but not limited to the encapsulant material from which the active device package is formed. Moreover, additives or fillers may be incorporated to enhance material properties such as, for example, stiffness, color, and tensile/compressive yield strength.

Referring to FIGS. 1–5, a plurality of lead frames 22 are shown at an intermediate step prior to encapsulation in the manufacturing process of device package 12. For illustrative purposes, the respective lead frames are indicated by the reference numbers 22a, 22b and 22c. It is noted that a VCSEL 28 is positioned on each lead frame and is electrically connected with lead frame leads 24 by bonding wires 60. A pair of tie bars 62 serve to support the ends of the lead frame leads. Adjacent each end of the lead frame leads, an alignment hole 64 is formed within the tie bars. Positioning of VCSEL 28 (or any other device being used) on die attach pad 26 of each lead frame is accomplished in precise relation to alignment holes 64. In this way, the location of the light active area (either light emitting or detecting) of the active device is precisely known within device package 12. Furthermore, encapsulation using encapsulant material 34 (see FIGS. 1–3) is also performed in precise reference to alignment holes 64. Therefore, a precise relationship is established between frusto-conical section 20 of the device package and the light active region (i.e., aperture) of the VCSEL or other such light active device. It is noted that alignment holes are not required for positioning accuracy. As one alternative example, reference may be taken to appropriate edges of the lead frame.

With reference to FIGS. 1–4 and having generally described the structure of opto-electronic assembly 10, a discussion will now be provided with regard to the highly advantageous passive alignment feature which results when assembly 10 is utilized. Initially, active device package 12 and light guide end housing 14 are provided as separate units. It should be appreciated that the present invention contemplates initally assembling the light guide end housing on the fiber optic cable and then assembling the light guide end housing with the active device package. In this way, the fiber optic cable and light guide end unit may be provided as a sub-assembly by a first party to a second party who may then perform the final step of assembling the light guide end housing with the active device package. As another alternative, the light guide end housing and the active device package may first be assembled and, thereafter, the fiber optic cable may be installed in the light guide end housing. Active device package 12 and light guide end housing 14 of assembly 10 are assembled by aligning key tab 58 on the active device package with key way 56 on the light guide end housing. It should be noted that an unlimited number of differently configured alignment features may be used to provide fixed rotational orientation of the active device package relative to the light guide end housing. All of these features are considered to be within the scope of the present invention. The "keyed" alignment feature described above or any other suitable alignment feature is useful in providing for proper indexing of lead frame leads 24 when assembly 10 is installed, for example, as one of a plurality (not shown) of optical coupling assemblies supported by an array housing (not shown). In such a case, the external outline of the light guide end housing may include indexing features or may be configured so that the light guide end housing of each optical coupling assembly is receivable in the array housing in only one, known orientation. Key tab 58 and key way 56 then ensure that lead frame leads 24 are also in a known orientation such that the lead frame leads of all of the optical subassemblies may be properly received, for example, by an appropriately configured printed circuit board (not shown). However, in a subsequent embodiment to be described, an additional purpose of such key alignment will be made evident.

Still referring to FIGS. 1–4, in accordance with the present invention, as frusto-conical section 20 of active device package 12 is positioned within frusto-conical cavity 18 of light guide end housing 14, the centering effect of the frusto-conical shapes brings about substantial, acceptable optical alignment between VCSEL 28 and end face 50 of fiber optic cable 16 with lens 36 properly positioned therebetween. Once frusto-conical section 20 has been received in frusto-conical cavity 18, the light guide end housing may be affixed to the active device housing using suitable means such as, for example, epoxy. Alternatively, an ultrasonic welding technique may be employed in which an energy director feature (not shown) is added, for example, to a surface 68 of active device package 12. Ultrasonic bonding will be described in detail below with reference to a second embodiment of the invention. It should be appreciated that the degree of optical coupling which is achieved between VCSEL 28 and fiber optic cable 16 is dependant upon the accuracy with which these components are positioned within their associated assemblies and the manufacturing tolerances with which these assemblies are produced. The present invention contemplates achieving a coupling efficiency of at least 60% in view of the development of highly accurate positioning/molding equipment. Still higher coupling efficiency may be achieved with the development of even more accurate equipment.

Assembly 10 is highly advantageous in contemplation of high volume mass production. The passive alignment feature described immediately above eliminates the need for time consuming active alignment such that the active device package and the light guide end housing may be assembled to one another in a rapid, yet highly accurate manner. Moreover, the completed assembly includes a limited number of individual components whereby to simplify assembly, as well as inventory concerns. Also, the light guide end housing may be produced to accommodate virtually any available fiber optic cable/ferrule combination which is currently available such as, for example, FC, ST, SMA, SC, MT, mini-MT, MU, LC or to be developed. Assembly of the light guide end housing to a fiber optic cable is also accomplished in a rapid manner since the cable simply inserts into the housing. In addition, the use of lead frame 22 in conjunction with plastic encapsulation is well suited for mass production of the active device package in accordance with known encapsulation methods. However, it should be appreciated that the VCSEL or other light active device must be precisely positioned on lead frame 22. In this regard, positioning of certain devices such as photodetector 31 (either alone or in combination with a VCSEL, as shown) on lead frame 22 may not be quite as critical as that of, for example, the positioning required for a VCSEL, since the photodetector may include an active surface which is comparatively much larger than the light emitting aperture of a VCSEL.

As mentioned, devices other than a VCSEL may be used in assembly 10. In general, relevant characteristics of these devices include emitting aperture size, beam divergence and beam shape. As examples: LEDs include an emitting aperture of approximately 20 microns to 50 microns with a relatively diffused circular beam (Lambertian emission) having a large divergence; edge emitters include an emitting aperture of approximately 3 microns to 20 microns with an elliptical beam pattern having moderate divergence; and VCSELs include a 3 micron to 20 micron aperture with a circular beam pattern having a relatively narrow divergence. Ideally, for optimum coupling, the diameter of the beam of the emitting device where it is incident on the end face of a target fiber optic cable should be circular in cross-section and less in diameter than the end face diameter of the target fiber. Minimal beam divergence is also advantageous. It is evident, therefore, that the VCSEL satisfies these requirements more closely than either the edge emitter or the LED. The latter is disadvantageous since its beam pattern is so diffused and broad that, even when intervening optics are used, only a fraction of the light output of the LED is generally coupled to the fiber. The edge emitter, in comparison, provides a much less divergent beam; however, the beam shape includes an elliptical pattern. The elliptical pattern creates significant difficulties in attempting to couple as much light as possible to the fiber without introducing inordinately asymmetric optics. Typically, the ends of the long dimension of the elliptical pattern may be cut off by intervening optics or a receiving fiber. The VCSEL, on the other hand, is well suited by virtue of its circular beam pattern and low divergence. These characteristics serve to explain, at least in part, the popularity of VCSELs in more recent opto-electronic assemblies.

Other characteristics of light emitting devices should be considered prior to incorporation into assembly 10. These characteristics include, but are not limited to power consumption and moisture resistance. As an example, an edge emitting CD laser is not well suited for use in assembly 10 since it requires a substantial heat sink in order to dissipate relatively high levels of heat. It is unlikely that lead frame 22 would provide the requisite heat sink capability to provide for long device life. Also, CD lasers are not immune to exposure to moisture. It is well known in the art that encapsulant materials useful in active device package 12 do not provide complete immunity to moisture. In contrast, the VCSEL is ideally suited for use in assembly 10 since (1) VCSELS draw low levels of current whereby to generate little heat during operation and (2) due to the fact that VCSELS exhibit high tolerance to moisture. It Is to be understood that heat sink and moisture resistance concerns may be overcome with the development of a lead frame (not shown) for use in assembly 10 which incorporates additional heat sink features or with the development of alternative molding material. However, presently, there is no compelling advantage in the use of an edge emitting CD laser in assembly 10, as compared with a VCSEL.

Referring to FIG. 4, another highly advantageous feature is provided by assembly 10 with regard to coupling light between VCSEL 28 and end face 50 of fiber optic cable 16. Specifically, lens 36 is integrally molded at the center of coupling surface 38 in a way which serves to focus light beam 32 onto end face 50 of the fiber optic cable. Thus, lens 36 enhances the amount of light which is coupled between an active device within active device package 12 and fiber optic cable 16. It should be appreciated that this feature is equally applicable with regard to coupling light emitted from fiber optic cable 16 to an active device such as, for example, a photodetector (not shown) which may be positioned on lead frame 22 or from an active device such as, for example, a VCSEL to a fiber.

Figures 6, 9:
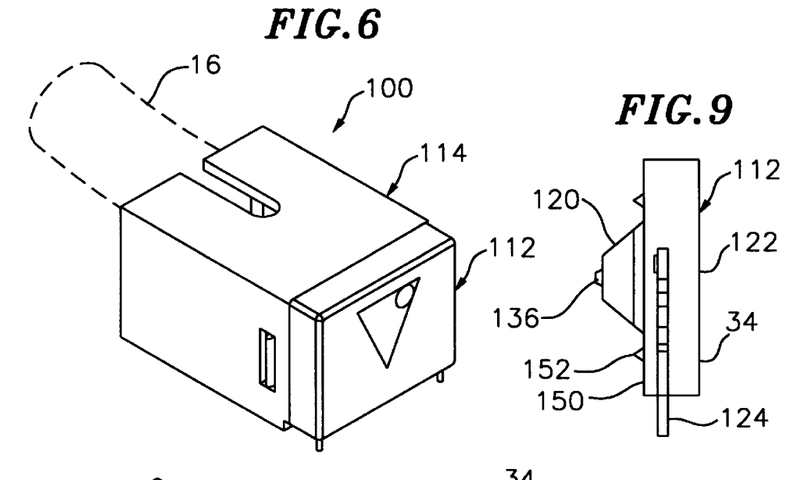
FIG. 6 is an enlarged diagrammatic view, in perspective, of a second embodiment of an opto-electronic coupling assembly which is manufactured in accordance with the present invention.
FIG. 9 is an enlarged diagrammatic view, in cross-section, of the opto-electronic coupling assembly of FIG. 6 shown here to illustrate details of the construction of the active device package illustrated in FIG. 8.
Figure 7:
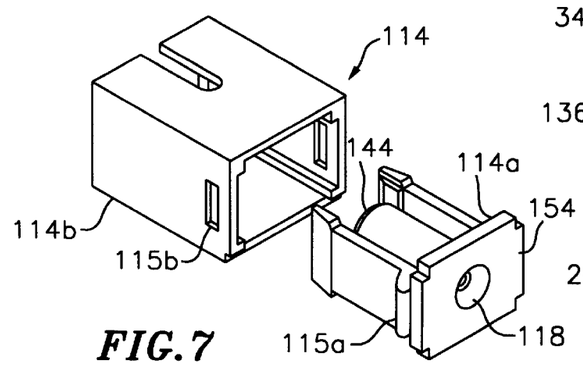
FIG. 7 is an enlarged diagrammatic view, in perspective, of a light guide end housing which forms part of the opto-electronic assembly of FIG. 6 and which is adapted to support one end of an elongated light guide.
Figure 8:
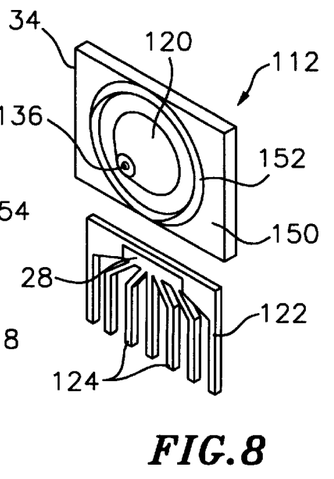
FIG. 8 is an enlarged diagrammatic exploded view, in perspective, of an active device package which forms part of the opto-electronic assembly of FIG. 6 and which supports an active device on a leadframe within an overall encapsulant material.

Turning now to FIGS. 6–8, a second embodiment of an opto-electronic coupling assembly, manufactured in accordance with the present invention, is generally indicated by the reference numeral 100. Since assembly 100 uses certain components which are used by assembly 10, like reference numbers will be applied to like components wherever possible and the reader is referred to previous descriptions of these components. Assembly 100 includes an active device package 112 and a light guide end housing 114. Light guide end housing 114 includes a cable support 114a which supports one end of fiber optic cable 16 and an outer housing 114b. Cable support 114a defines a frusto-conical cavity 118 (FIG. 7) which is configured for receiving a frusto-conical section 120 (FIG. 8) of the active device package in accordance with the highly advantageous passive alignment feature of the present invention, as described above with regard to assembly 10. Active device package 112 includes a lead frame 122 having a plurality of electrically conductive leads 124 (in this instance seven leads) and a die attach pad 26. In similarity with lead frame 22 of assembly 10, lead frame 122 may be formed from suitable materials such as, for example, KOVAR, ALLOY 42, ALLOY 52, and INVAR.

Referring to FIG. 9 in conjunction with FIGS. 6–8, VCSEL 28 is mounted on lead frame 122 in a known way so as to be in both thermal and electrical communication with the lead frame. Bonding wires are used to interconnect lead frame leads 124 with VCSEL 28, but have not been shown in the present figures for purposes of clarity. Operation of assembly 100 is essentially the same as operation of assembly 10, described above. Moreover, it is to be understood that assembly 100 is not to be considered as limited to use of a VCSEL serving as a light emitting semiconductor device. Any suitable light emitting or light receiving semiconductor device either currently available or to be developed may be used. Like active device package 12 of assembly 10, active device package 112 of assembly 100 includes encapsulant material 34 which surrounds VCSEL 28 and portions of lead frame leads 124. In accordance with the present invention, encapsulant material 34 is molded in a predetermined configuration which is similar to that used in assembly 10 since the encapsulant material serves to support the overall assembly, as well as to define frusto-conical section 120. In addition, the encapsulant material serves to aid in directing light from VCSEL 28 to a molded lens 136 in essentially the same manner as described with regard to FIG. 6. Precise positioning of VCSEL 28 (or any other device being used) on lead frame 122 may be accomplished using, for example, alignment holes, as decribed previously. Moreover, encapsulation may be performed with reference to the same alignment holes such that the location of the light active area (either light emitting or detecting) of the active device is precisely known within device package 112.

With reference to FIG. 7, in addition to defining frusto-conical cavity 118, cable support 114a includes a fiber optic cable sleeve 144 which is configured for receiving ferrule 46 of cable 16 (see FIG. 4) in the same manner as sleeve 44 of assembly 10. Housing 114b is configured to snap onto cable support 114a by means of engaging locking members 115a on the cable support with notches 115b integrally formed in housing 114b. As is the case in assembly 10, the position of the end face of cable 16 (see FIG. 4) is in a known, predictable position within the cable support and relative to frusto-conical cavity 118. This precise positioning of the end face of the cable relative to the frusto-conical cavity, as provided by the light guide end housing, is crucial within the overall passive alignment implementation of the present invention. Thus, when active device package 112 and light guide end housing 114 are assembled as illustrated in FIG. 6, the active device is passively brought into optical alignment with the end face of the fiber optic cable connectors, as occurs in assembly 10. The cable support is readily adapted for all known types of fiber optic cables and those to be developed. It should be appreciated that assembly 100 shares all of the advantages of assembly 10 with regard to the highly advantageous passive alignment feature of the present invention as well as high volume mass production capabilities.

Referring to FIGS. 8 and 9, another feature of assembly 100, which is readily incorporated in assembly 10, resides in provisions for ultrasonically bonding active device package 112 with light guide end housing 114. To this end, active device package 112 includes a mounting surface 150 upon which an energy director feature 152 is formed in the overall encapsulant outline. Bonding is accomplished by positioning active device package 112, for example, on an acoustical platform vibrating at an appropriate frequency which may range from 10–80 KHz. At the same time, light guide end housing 114 is biased against active device package 112 such that the energy director comprises the sole point of contact between the active device package and light guide end housing. With the relatively small energy director feature in contact with a front surface 154 of cable support 114a, the concentrated vibrational energy produces heat whereby the energy director melts and the two components are permanently bonded to one another as passive alignment is completed. Of course, when ultrasonic bonding is to be performed, the frusto-conical section of the active device package should be configured so as to be fully received in the frusto-conical cavity of the cable support at the conclusion of bonding. It should be appreciated that the ultrasonic bonding technique contemplated herein is consistent with high volume, mass production of opto-electronic coupling assemblies. However, conventional approaches such as adhesives may be employed.

Figure 10:
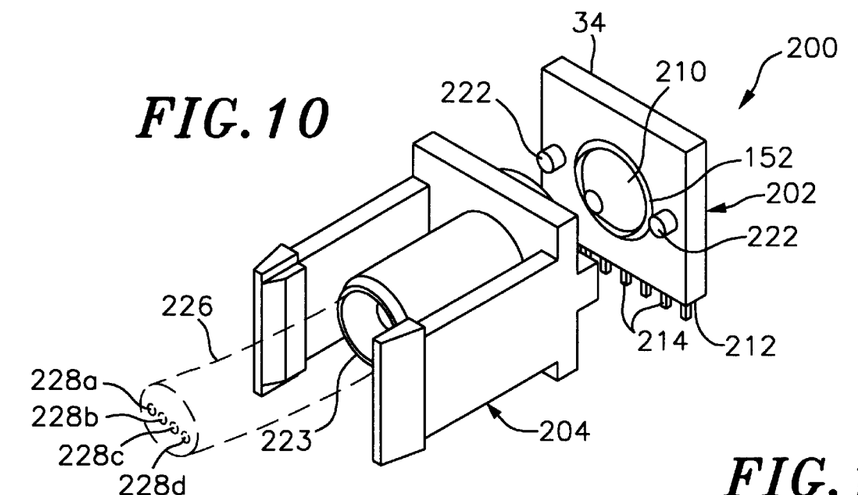
FIG. 10 is an enlarged diagrammatic view, in perspective, of a third embodiment of an opto-electronic coupling assembly which is manufactured in accordance with the present invention for coupling an array of active devices with an array arrangement of light guides.
Figure 11:
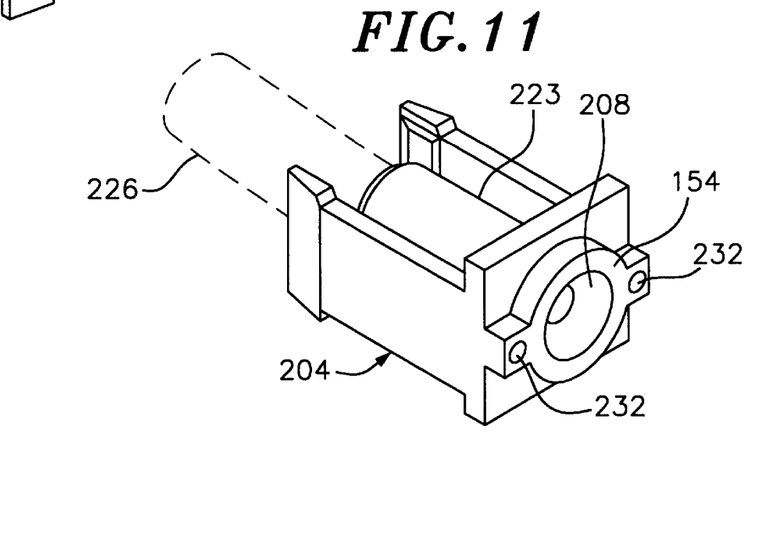
FIG. 11 is an enlarged diagrammatic view, in perspective, of a light guide end housing which forms part of the opto-electronic coupling assembly of FIG. 10, shown here to illustrate further details of its construction.

With reference now to FIGS. 10 and 11, a third, array embodiment of an opto-electronic coupling assembly, manufactured in accordance with the present invention, is generally indicated by the reference numeral 200. Like previously described assembly 100, assembly 200 uses certain components which are used by assembly 10. Therefore, like reference numbers have been applied to like components wherever possible and the reader is referred to previous descriptions of these components. Assembly 200 includes an active device package 202 and a light guide end housing 204. The latter defines a frusto-conical cavity 208 (FIG. 11) which is configured for receiving a frusto-conical section 210 (FIG. 10) of the active device package in accordance with the passive alignment teachings of the present invention.

Figure 12:
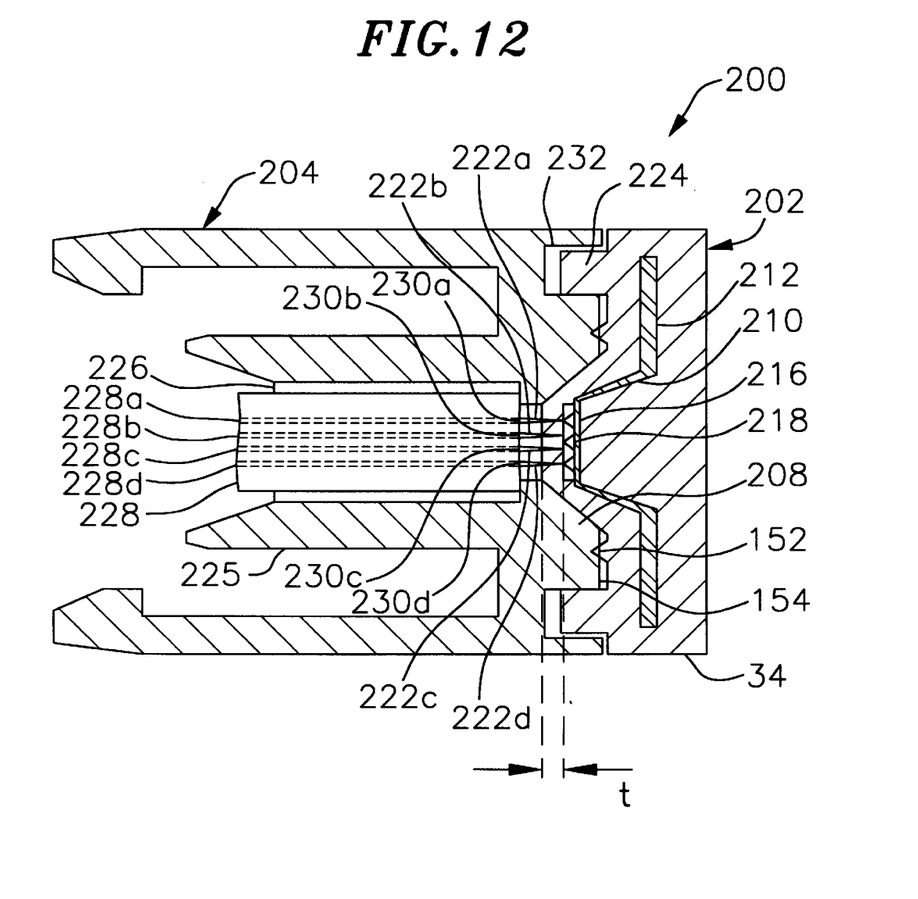
FIG. 12 is an enlarged diagrammatic view, in cross-section, showing the opto-electronic coupling assembly of FIG. 10 with its light guide end housing and active device housing assembled such that an array of active devices is passively aligned with an array of light guides.

Turning to FIG. 12 in conjunction with FIGS. 10 and 11, assembly 200 includes a lead frame 212 having a plurality of electrically conductive leads 214 (in this instance 7 leads) and a die attach pad 216. Like previously described lead frames, lead frame 212 may be formed from suitable materials such as, for example, KOVAR, INVAR, Alloy 42, Alloy 52 and CRS 18. An active die 218 is mounted in thermal communication with the lead frame on die attach pad 216. In this instance, die 218 includes an integrated linear array of four VCSEL's (not individually shown) each of which emits a respective beam of light 222a–d. Die 218 is precision mounted on die attach pad 216, for example, with reference to alignment holes in the lead frame (not shown) in a manner similar to that described with regard to FIG. 5. However, in this instance, alignment of die 218 must also accomplish precise rotational orientation of linear VCSEL array 220 with respect to the lead frame. Bonding wires are used to interconnect lead frame leads 214 with die 218, but have not been shown for purposes of clarity.

As in previous embodiments, encapsulant material 34 is molded in a predetermined configuration which serves to define aforementioned frusto-conical section 210. In addition, encapsulant material 34 of active device package 202 defines a pair of alignment pins 224 which are positioned in precise relationship to frusto-conical section 210 and with respect to die 218 with its VCSEL array, including rotational orientation of the VCSEL array on die attach pad 216 using, for example, aforementioned lead frame alignment holes. With regard to any embodiment of the present invention, it should be mentioned that control of rotational orientation is enhanced in direct relation to increasing the distance of an indexing feature such as alignment pins 224 from the center axis of the assembly (as defined, in this instance, by frusto-conical section 210). Since alignment pins 224 are at a significant distance from the center axis of frusto-conical section 210 in assembly 200, precise rotational control is provided by this embodiment in contemplation of the use of a VCSEL array.

With regard to light coupling efficiency, the thickness of material 34, through which beams 222 pass, is indicated as "t" in FIG. 12. For purposes of improving coupling efficiency, t should be as small as practical on the order of, for example, 5 microns to 1,000 microns for reasons to be described below. It should be appreciated that the entirety of the plastic portion (including alignment pins 224) of the active device package is formed in a monolithic manner from previously described molding material 34, resulting in precise, inexpensive manufacturability.

Still referring to FIGS. 10–12, light guide end housing 204 includes a barrel 225 which receives a ferrule 226. The latter, in turn, supports a bundled fiber optic cable array 228 which includes four individually jacketed fiber optic members 228a–d. Thus, ferrule 226 and housing 204 support cable 228 such that end faces 230a–d of fibers 228 are in precise, known locations relative to frusto-conical cavity 208, as defined by light guide end housing 204. In addition, light guide end housing 204 includes a rotational alignment feature in the form of a pair of alignment holes 232 which are molded in precise positions relative to frusto-conical cavity 208 and, therefore, in precise positions relative to end faces 230 of fibers 228. It should be appreciated that fibers 228 are arranged in a linear array which corresponds to the arrangement of the VCSEL's in active device package 202. In the present example, a common connector for use with cable 226 is known in the art as a mini-MT connector. However, it should be appreciated that the present invention contemplates the use of any suitable ferrule/fiber array arrangement, as will be discussed in further detail at an appropriate point below.

For purposes of permanently bonding active device package 202 to light guide end housing 204, active device package 204 includes previously described energy director feature 152 and corresponding front surface 154. Essentially, passive alignment is accomplished as described with regard to previous embodiments as frusto-conical section 210 is positioned and fully seated within frusto-conical cavity 208. At the same time, alignment pins 224 are positioned within alignment holes 232 so as to provide for rotational alignment of the VCSEL array of die 218 relative to end faces 230 of fibers 228. Once this positioning is accomplished, ultrasonic welding may be performed to bond energy director feature 152 to front surface 154 so as to maintain the accomplished passive alignment.

Referring to FIG. 12, as mentioned previously, thickness t of material 34 should be kept as small as possible in order to ensure efficient light coupling. Essentially, the embodiment of FIG. 12 accomplishes "butt coupling" between the active devices and fiber faces by keeping t as small as practical. One reason for this approach resides in the fact that the VCSEL beams diverge as they travel towards the fiber end faces. Thus, beam diameter is reduced at the fiber end faces by limiting the value of t. Another reason for this approach resides in the fact that most manufacturers provide fibers 228, laterally positioned as closely as possible to one another. For example, typical center-to-center spacing of such bundled fibers is on the order of 750 μmeters. With such closely positioned fibers, lens curvature limitations prohibit the use of lenses which are molded from material 34 in the manner illustrated by FIG. 4. However, as will be seen, with appropriate fiber-to-fiber spacing, it is to be understood that the present invention contemplates the use of molded lenses forming part of material 34 in an array embodiment.

Figure 13:
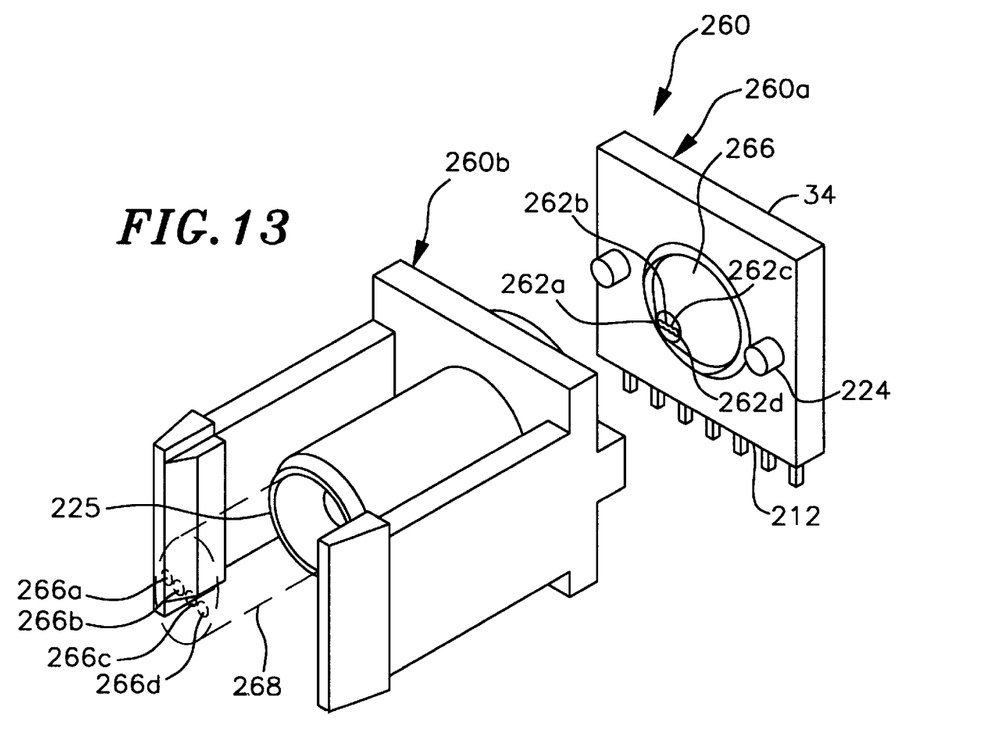
FIG. 13 is an enlarged diagrammatic view, in perspective, illustrating a fourth embodiment of the present invention having an array of active devices where lenses are molded as an integral part of the encapsulating material used in the active device package.
Figure 14:
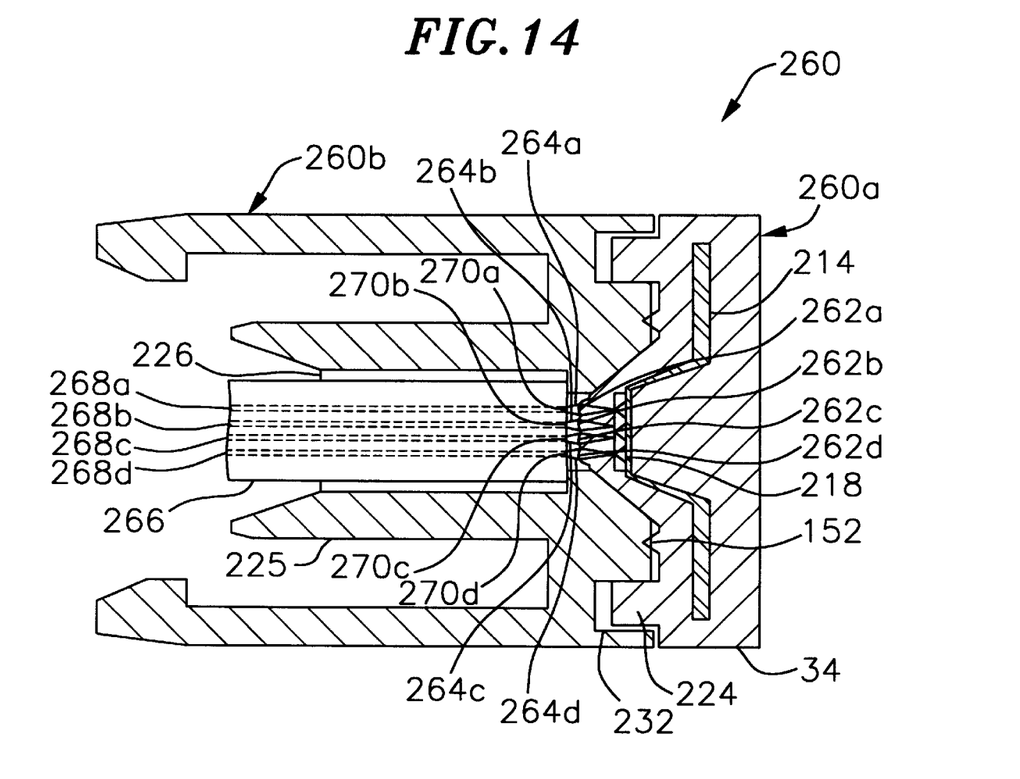
FIG. 14 is an enlarged diagrammatic view, in cross-section, of the assembly of FIG. 13 shown here to illustrate details regarding the array of lenses in passive alignment between a VCSEL array and a light guide array.

Attention is now directed to FIGS. 13 and 14 which illustrate another array or bundled fiber opto-electronic coupling assembly manufactured in accordance with the present invention and generally indicated by the reference numeral 260. Essentially, assembly 260 is identical to assembly 200 and, therefore, will not be described in detail for purposes of brevity. Reference numbers of like components which appear in preceding figures have been applied where possible and descriptions of these components will not be repeated in the interest of brevity. However, it should be appreciated that these components may be configured in an appropriate manner for use in assembly 260. The assembly includes an active device package 260a and a light guide end housing 260b. While assembly 260 shares the advantages of assembly 200, one significant difference in assembly 260 lies in the provision of lenses 262a–d which are molded from material 34 in the manner described with regard to lenses 36 and 136 of FIGS. 4 and 9, respectively. Encapsulant 34 defines a frusto-conical cavity 264 (FIG. 14) which is configured for receiving a frusto-conical section 266 of the active device package in accordance with the passive alignment teachings of the present invention.

Still referring to FIGS. 13 and 14, light guide end housing is adapted to support a fiber optic cable assembly 266 which includes individual fibers 268a–d. Each fiber includes an end face 270a–d positioned on the end of cable assembly 266. The curvatures of lenses 262 are appropriate to couple light beams 264a–d into confronting fiber end faces 270a–d, respectively. Fibers 268 may, for example, be provided as separate fibers or as part of a bundled fiber cable, as shown, having appropriate fiber-to-fiber spacing. It should also be noted that thickness t (not shown here) may be increased relative to that shown in FIG. 12, since the present assembly does not require a butt coupled approach. For example, in assembly 260, thickness t may be approximately 5μ to 3,000μ.

With regard to bundled fibers and arrayed active devices, it is to be understood that an unlimited number of embodiments may be provided. For example, active device arrays ranging in number from two to sixty-four or more may be provided. These devices may be discrete or integrated. In addition, active device array configurations may include different types of devices. For example, paired array arrangements of photo-detectors and laser devices may be provided. As another example, a device array may include one bank of one device type and another bank of another device type. Moreover, the arrangement of the array need not be linear, but may include any sort of matrix arrangement either known or to be developed. It should be appreciated that by merely scaling the physical dimensions of the active device package of the present invention with its passive alignment enabling configuration, virtually any number or configuration of active devices may be accommodated. In addition to the previously mentioned MT connector configuration, the teachings of the present invention are useful with any bundled fiber configuration either currently available or to be developed.

Since the opto-electronic coupling assembly of the present invention may be provided in a variety of different configurations and produced using a number of different methods, it should be understood that the present invention may be embodied in many other specific forms without departing from the spirit or scope of the invention. Therefore, the present examples and methods are to be considered as illustrative and not restrictive, and the invention is not to be limited to the details given herein, but may be modified within the scope of the appended claims.

What is claimed is:

1. An opto-electronic coupling assembly for optically coupling a light active area of an active device with an end face at one end of an elongated light guide such that light is coupled between the end face of the light guide and the light active area of the active device, said coupling assembly comprising:
   a) a light guide end housing defining a housing outline and adapted to support the end of said light guide including said end face;
   b) an active device package including
      i) an arrangement for supporting said active device and for providing external electrical connections to the active device, and
      ii) an encapsulant material surrounding said active device and at least partially surrounding said support arrangement, said encapsulant material being substantially optically transparent to the coupled light and said encapsulant material being molded in a predetermined configuration which cooperates with the housing outline of the light guide end housing in a way that passively places the light active area of the active device into substantial optical alignment with the end face of the light guide when the light guide end housing is assembled with the active device package.

2. The opto-electronic assembly of claim 1 wherein the predetermined configuration of said encapsulant material defines a coupling surface in a confronting relationship with the light active area of the active device such that, when the light guide end housing is assembled with the active device package, the predetermined configuration of the encapsulant material directs light emitted by the active device through the coupling surface toward the end face of the elongated light guide or directs light emitted by the end face of said light guide and incident on said coupling surface toward the light active area of the active device.

3. The opto-electronic assembly of claim 1 wherein the predetermined configuration of said encapsulant material defines a coupling surface in a confronting relationship with the light active area of the active device and wherein the predetermined configuration of said encapsulant defines a frusto-conical section having a diameter which decreases in a direction away from the active device such that said coupling surface forms an end of the frusto-conical section away from the active device and wherein said light guide end housing defines a frusto-conical cavity which is configured to receive said frusto-conical section in a way which optically aligns the light active area of said active device with the end face of said elongated light guide when the light guide end housing is engaged with the active device package.

4. The opto-electronic assembly of claim 3 wherein the frusto-conical section of the active device package and the frusto-conical cavity of the light guide end housing are configured such that placing the frusto-conical section into the frusto-conical cavity automatically optically aligns the light active area of the active device with the end face of the elongated light guide.

5. The opto-electronic assembly of claim 3 wherein said encapsulant material integrally forms a lens on said coupling surface for focusing light emitted by the active device on the end face of the elongated light guide or for focusing light emitted by the end face of said light guide and incident on the lens onto the light active area of the active device.

6. The opto-electronic assembly of claim 1 wherein said arrangement for supporting the active device and for providing external electrical connections to the active device includes a lead frame having a die attach pad on which said active device is mounted.

7. The opto-electronic assembly of claim 1 wherein said encapsulant material defines means for attaching said active device housing to said light guide end housing.

8. The opto-electronic assembly of claim 7 wherein said attaching means defined by the encapsulant material includes an upstanding ridge portion configured for ultrasonic welding with the light guide end housing when the frusto-conical section of the active device package is received by the frusto-conical cavity of the light guide end housing such that the light active area of the active device is optically aligned with the end face of the elongated light guide.

9. The opto-electronic assembly of claim 1 wherein said active device comprises a VCSEL for emitting said light to be coupled to the end face of said elongated light guide.

10. The opto-electronic assembly of claim 1 wherein said active device comprises a photodetector for detecting said light emitted from the end face of said elongated light guide.

11. The opto-electronic assembly of claim 1 wherein said elongated light guide defines an axis and wherein said predetermined configuration of said encapsulant material of the active device package further cooperates with the housing outline of the light guide end housing, when the light guide end housing is assembled with the active device package, to provide a substantially fixed rotational orientation between said active device package and said light guide end housing relative to said axis.

12. An opto-electronic coupling assembly for optically coupling an array of light active areas defined by an active device with a plurality of elongated light guides such that each active area is aligned with an end face of one elongated light guide, said coupling assembly comprising:
   a) a light guide end housing defining a housing outline and adapted to support one end of each light guide member associated with each end face;
   b) an active device package including
      i) an arrangement for supporting said active device and for providing external electrical connections to the active device, and
      ii) an encapsulant material surrounding said active device and at least partially surrounding said support means, said encapsulant material being substantially optically transparent to the coupled light and said encapsulant material being molded in a predetermined configuration which cooperates with the housing outline of the light guide end housing in a way that passively places each light active area into substantial optical alignment with the end face of one light guide when the light guide end housing is assembled with the active device package.

13. The opto-electronic assembly of claim 12 wherein the predetermined configuration of said encapsulant material defines a coupling surface in a confronting relationship with the light active areas of the active device and wherein the predetermined configuration of said encapsulant defines a frusto-conical section having a diameter which decreases in a direction away from the active device such that said coupling surface forms an end of the frusto-conical section away from the active device and wherein said light guide end housing defines a frusto-conical cavity which is configured to receive said frusto-conical section in a way which optically aligns each light active area of said active device with one end face of one of said elongated light guides when the light guide end housing is assembled with the active device package.

14. The opto-electronic assembly of claim 12 wherein said encapsulant material integrally forms a plurality of lenses on said coupling surface one of which is associated with each light active area for focusing light emitted by the light active area on one end face of one of the elongated light guides or for focusing light emitted by one end face of one of said light guides and incident on one lens onto the associated light active area of the active device.

15. The opto-electronic assembly of claim 12 wherein said arrangement for supporting the active device and for providing external electrical connections to the active device includes a lead frame on which said active device is mounted.

16. The opto-electronic assembly of claim 12 wherein said encapsulant material defines means for attaching said active device housing to said light guide end housing.

17. The opto-electronic assembly of claim 16 wherein said attaching means defined by the encapsulant material includes an upstanding ridge portion configured for ultrasonic welding with the light guide end housing when the frusto-conical section of the active device package is received by the frusto-conical cavity of the light guide end housing such that the ultrasonic weld formed using the upstanding ridge portion is the sole attachment between the light guide end housing and the active device housing and each light active area of the active device is optically aligned with the end face of one of the elongated light guides.

18. The opto-electronic assembly of claim 12 wherein said active device comprises a single die including a plurality of VCSELs for defining said light active areas.

19. The opto-electronic assembly of claim 12 wherein said active device comprises a single die including a plurality of photodetectors each of which is arranged for detecting light emitted from the end face of one of said elongated light guides.

20. The opto-electronic assembly of claim 12 wherein said predetermined configuration of said encapsulant material of the active device package further cooperates with the housing outline of the light guide end housing, when the light guide end housing is assembled with the active device package, to provide a substantially fixed rotational orientation of said active device package relative to said light guide end housing.

21. In an opto-electronic coupling assembly for optically coupling a light active area of an active device with an end face at one end of an elongated light guide such that light is coupled between the end face of the light guide and the light active area of the active device, a method of providing for alignment of said end face with said light active area, said method comprising the steps of:
   a) supporting the end of said light guide including said end face in a light guide end housing which defines a housing outline;
   b) arranging the active device on a support member and providing for external electrical connections to the active device; and c) encapsulating said active device and at least partially encapsulating said support means with an encapsulant material which is substantially optically transparent to the coupled light, the encapsulant material being molded in a predetermined configuration which cooperates with the housing outline of the light guide end housing in a way that passively places the active device into substantial optical alignment with the end face of the light guide when the light guide end housing is assembled with the active device package.

22. The method of claim 21 wherein the predetermined configuration of said encapsulant material defines a coupling surface in a confronting relationship with the light active area of the active device such that, when the light guide end housing is assembled with the active device package, the predetermined configuration of the encapsulant material directs light emitted by the active device through the coupling surface toward the end face of the elongated light guide or directs light emitted by the end face of said light guide and incident on said coupling surface toward the light active area of the active device.

23. The method of claim 21 wherein the predetermined configuration of said encapsulant material defines a coupling surface in a confronting relationship with the light active area of the active device wherein said encapsulating step includes the step of forming the predetermined configuration of said encapsulant to define a frusto-conical section in a first known, positional relationship to the light active area of the active device and having a diameter which decreases in a direction away from the active device such that said coupling surface forms an end of the frusto-conical section away from the active device and wherein said step of supporting the end of the elongated light guide includes the step of defining a frusto-conical cavity in a second, known positional relationship relative to said end face of the elongated light guide and which frusto-conical cavity is configured to receive said frusto-conical section in a way which passively optically aligns the light active area of said active device with the end face of said elongated light guide as a result of the first and second known positional relationships.

24. The method of claim 21 further comprising the steps of:

d) assembling the light guide end housing with the active device package to bring the light active area of the active device into initial optical alignment with the end face of the light guide through the cooperation of predetermined configuration of the active device package and the housing outline of the light guide end housing; and e) ultrasonically bonding the active device housing to the light guide end housing such that permanent alignment is maintained by an ultrasonic bond.

25. The method of claim 24 wherein said encapsulating step includes the step of forming ultrasonic bonding means on said active device package such that only said ultrasonic bonding means contacts the light guide end housing when said initial optical alignment is accomplished and said ultrasonic bonding step causes said ultrasonic bonding means to at least partially melt so as to form said ultrasonic weld.

* * * * *